United States Patent [19]
Lindemann et al.

[11] Patent Number: 4,933,536
[45] Date of Patent: Jun. 12, 1990

[54] CHECK PROCESSING DEVICE

[75] Inventors: Dennis Lindemann, Portland; John Smith-Hill, Beaverton, both of Oreg.

[73] Assignee: Dennis Lindemann, Portland, Oreg.

[21] Appl. No.: 348,295

[22] Filed: May 4, 1989

Related U.S. Application Data

[63] Continuation-in-part of Ser. No. 103,534, Oct. 1, 1987, abandoned.

[51] Int. Cl.$^5$ .................................................. G06F 15/20
[52] U.S. Cl. ................................. 235/375; 235/487; 902/22
[58] Field of Search ................ 238/375, 487; 364/405; 902/22

[56] References Cited

U.S. PATENT DOCUMENTS

| | | | |
|---|---|---|---|
| 4,172,552 | 10/1979 | Casie | 902/22 |
| 4,317,172 | 2/1982 | Nakano | 364/405 |
| 4,658,126 | 4/1987 | May | 235/487 |
| 4,678,896 | 7/1987 | Carlson | 902/22 |

Primary Examiner—Harold I. Pitts
Attorney, Agent, or Firm—Dellett, Smith-Hill and Bedell

[57] ABSTRACT

A check processing device incorporated in a point of sale terminal comprises a xerographic copier to reproduce an image of personal identification onto the back of a check, an electronic stamping mechanism for imprinting a transaction date, time and number on the back of the check and a scanner which reads and stores a customer's checking account number and controls a cash register according to the validity and presence of the check and the presence of personal identification.

7 Claims, 5 Drawing Sheets

CHECK PROCESSING DEVICE

CROSS REFERENCE TO RELATED APPLICATION

This is a continuation-in-art of co-pending Pat. Application Ser. No. 07/103,534 filed Oct. 1, 1987 now abandoned.

BACKGROUND OF THE INVENTION

The present invention relates in general to copying and check processing machines and in particular to a check processing device incorporated into a point of sale terminal to process check transactions.

Dishonored checks from customers are a frequent problem for retailers. It is necessary for the retailer to ensure the value of checks received, but he must do so in a manner that is not objectionable to customers. In order to reduce the risk that a check will be dishonored, a retailer will often require the person presenting the check to provide two pieces of identification, such as a driver's license and a credit card or check guarantee card. At a point of sale terminal, a salesclerk writes the customer's license and credit card numbers together with expiration dates on the check in an effort to identify the person writing the check to ensure payment thereof. However, even with this practice the incidence of dishonored checks is high.

The mere recording of numerical identification on the check does not effectively deter customers from passing bad checks because there is no convenient or effective way of positively linking the true identify and address of the individual writing the check to that particular transaction. Previously, a salesclerk was unable to conveniently record an image of the customer and his or her personal identification and as a result, dishonest customers were able to employ various schemes to deceive retailers such as falsifying their identification by placing a personal photograph on a fake or stolen driver's license and using it together with other stolen or phony identification and checks. Since the customer's photograph and true identity were not recorded by the retailer, there was no fear of being caught, and the dishonest customer was at liberty to deceive the retailer. Also, a customer may knowingly or unknowingly write checks on an account with insufficient funds. A method of accurately and effectively recording such an individual's identity is necessary to deter these practices.

An attempt to deter such activity by copying several numbers by hand from a customer's identification cards is tedious, time consuming and error prone. If a transcription error does occur or the salesclerk overlooks an expired card, the customer using a stolen check or an account with insufficient funds cannot be adequately identified and located or the check is not guaranteed.

Typical video surveillance systems do not link a particular customer to a bad check because literally hundreds of persons can pass through each point of sale terminal each day, and it is difficult or impossible for a salesclerk to remember which persons write which checks. Even if a retailer were to go to the expense of using a typical close-up video system to record an image of both the customer and his or her check, customers would likely object to reproductions of their likeness, signatures, credit cards and checks being retained by the retailer so as to be easily accessible by store personnel and others exposing customers to possible inappropriate use of their accounts. As a result, retailers who use such methods could lose business from objecting customers.

Another method of preventing dishonored checks is the comparing of a customer's checking account or identification against "hot sheets". Such manual comparison of customer identification and checking account numbers with "hot sheets" retained by the retailer is tedious, time consuming and error prone and can be offensive to the customer.

Similar to the problem of dishonored checks, dishonest customers, who for example have stolen credit cards, can deceive retailers by making purchases with stolen credit cards using stolen or fake identification. A convenient and effective method of preventing such practices is also needed.

In addition to the above described problems, a dishonest salesclerk might knowingly deceive his or her employer by taking a known bad check or allowing a friend to write a check without proper identification, contrary to store policy. Previously there was no way to prevent this from happening other than relying on the deterrent value of punishing the salesclerk upon discovering the violation or requiring the salesclerk to cover dishonored checks with his or her own paycheck.

U.S. Pat. No. 4,658,126 issued Apr. 14, 1987 to May discloses the idea of forming a xerographic image of customer identification on the back of a check.

SUMMARY OF THE INVENTION

A check processing device in accordance with one aspect of the invention is incorporated in a point of sale terminal to facilitate check tender transactions and to deter the use of false identification or stolen checks that are subsequently dishonored. It comprises a small xerographic copier to reproduce an image of a customer's identification on a tendered check, a transaction update and stamping mechanism which stamps the retailer's endorsement, current date, time and transaction number on the check and a scanning device which reads the customer's checking account number and sends it to a computer which will save it and compare it against a "hot sheet" stored in computer memory. The scanning device also scans the back side of the check to verify that the customer's identification has been reproduced thereon. The check processing device is hard wired to the cash register so that the register's check tender button may not operate until the existence and validity of a check and the existence of personal identification are verified.

The copying of a customer's photographic identification onto the back of a tendered check will deter customers from passing bad checks, because the dishonest customer's photograph will be right on the bad check and will help lead him or her to criminal prosecution. Dishonest customers may no longer place their pictures in stolen identification cards in hopes of completely deceiving retailers as to their true identity because their picture will be recorded on the check along with the false identification.

By using a check processing device in accordance with the present invention, salesclerks will more carefully screen customers visually to see that their pictures match their actual likeness. Since salesclerks will be aware that a customer's identification must be xerographically reproduced on the back of a check, he or she will pay more attention to the photograph on the driver's license to see that it will be reproduced well and that the picture is indeed a likeness of the customer who is presenting the identification. By doing so, the salesclerk is reminded to do a better job of comparing the customer's photograph to his or her actual likeness. This will deter the use of stolen identification by dishonest customers and will lessen the occurrence of dishonored checks.

By reproducing a customer's personal identification on the back of a tendered check via a xerographic copier, the possibility of error in manual transcription is eliminated and the entire identification can be quickly placed on the check. This ensures an accurate transcription of the customer's personal identification allowing salesclerks to process more transactions in a shorter period of time. Thus the check processing device improves the efficiency of salesclerks and purchase transactions where a check is tendered.

The transaction information mechanism electronically updates the stamp to the current date, time and transaction number, and automatically stamps the information on the back of the check as it passes through the check processing device. If a check is dishonored, this mechanism allows the retailer to immediately pinpoint the transaction so that the customer may be identified and prosecuted.

The scanning device that reads the customer's checking account number and sends it to the computer so that it can be verified by comparison with a "hot sheet" in the computer's memory speeds up the transaction, makes it less objectionable to the customer and more effectively screens potential dishonored checks. Modern computers can receive the information from the scanner and process it in seconds or fractions thereof and do so without human error. Pertinent account and transaction information is stored in the computer's memory to be used in subsequent transactions and to provide a record of the transaction. Since the customer doesn't see the salesclerk manually comparing his or her check and identification against "hot sheets" and doesn't see an image being made of personal identification and the tendered check on a medium other than the tendered check, the transaction is not offensive to the customer. Computer stored information is not as readily accessible to store personnel or others so that customers are protected against inappropriate use of their accounts. After the transaction the tendered check, with the reproduced identification and the transaction information thereon, is processed and canceled as usual so that no visual record of the customer's check and identification is retained in the retailer's possession. Thus, the retailer who uses a check processing device in accordance with the present invention will not lose customers who object to images of their account numbers and identification being retained by retailers. If a check is found to be invalid, the salesclerk can call a person in charge and the situation can be handled in a discreet manner without embarrassment to the customer. Thus, the use of a scanner integrated into the check processing device facilitates the transaction making it less time consuming and offensive to the customer while it offers greater protection and deterrent value against dishonored checks.

In accordance with another aspect of the invention, a check processing device prevents salesclerks from disobeying store policy regarding personal identification for checks by requiring them to receive proper identification from customers. With the check processing device being hard wired to the cash register, the presence of personal identification accompanying a check is required before the transaction can be completed. This ensures the enforcement of store policy by requiring proper identification and check processing before a salesclerk can complete the transaction. The transaction date, time and number can be combined and stored with other information in the computer such as a register number and a salesclerk identification number, and if a check is dishonored, the salesclerk who received it can be quickly pinpointed and dealt with. This will deter salesclerks from aiding friends by not requiring proper identification and will deter customers from asking a salesclerk to violate store policy as it will be common knowledge between the customer and the salesclerk that the transaction cannot be completed without proper identification.

It is accordingly an object of the invention to deter customers from using false identification and passing bad checks and prevent the occurrence of dishonored checks by accurately and conveniently reproducing identification information on the back of a tendered check.

It is another object of the invention to increase salesclerks' awareness of customers' photographs and actual likenesses to more efficiently notice differences in them and as a result have a deferring effect on the use of fake or stolen identification by dishonest customers.

It is yet another object of the invention to reduce salesclerk transcription errors which occur in the tedious and time consuming process of copying personal identification particulars by hand onto a tendered check.

It is another object of the invention to facilitate check transactions making them quicker, less offensive to the customer and more efficient.

It is still another object of the invention to prevent violation of store policy regarding check transactions by requiring salesclerks to receive proper identification from all customers who tender checks as payment for merchandise, by controlling the use of the cash register's check tender button according to the presence and validity of the tendered check and the presence of personal identification.

BRIEF DESCRIPTION OF THE DRAWINGS

For a better understanding of the invention, and to show how the same may be carried into effect, reference will now be made, by way of example, to the accompanying drawings in which:

FIG. 3 is a front elevation of the check processing device of FIGS. 1 and 2.

DETAILED DESCRIPTION

Figure 7:
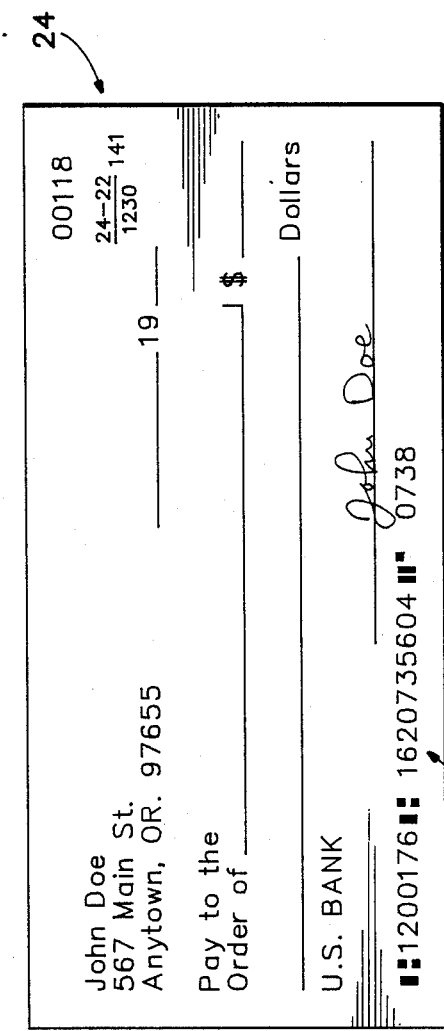
FIG. 7 is a pictorial representation of a check to be used in the check processing device of FIGS. 1-3.
Figure 8:
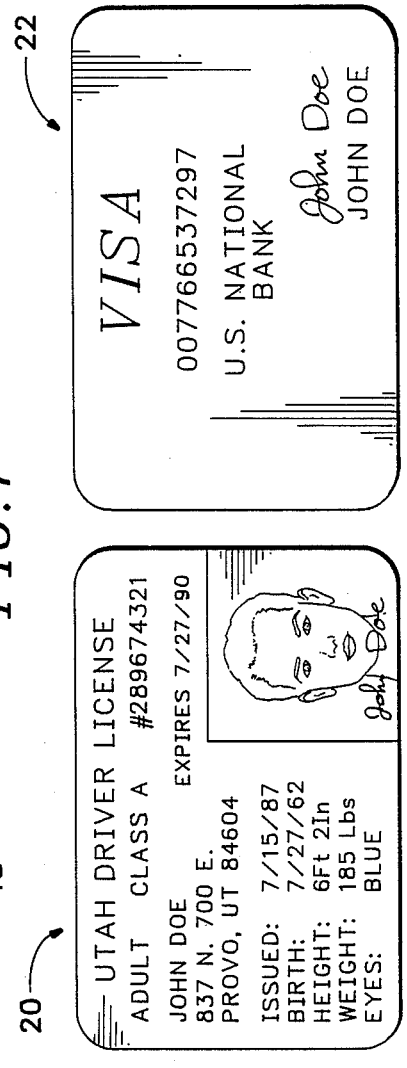
FIG. 8 is a pictorial representation of a driver's license and credit card suitable for use with the check processing device of FIGS. 1-3.

Referring to FIGS. 1-8, a check processing device 10 comprises a small xerographic copier 52 combined with an electronically updated and operated stamp mechanism 12 and a scanning device 14. Stamp mechanism 12 is connected to a transaction counter 54 and a clock 56 for updating the stamp mechanism. The copier 52, stamp mechanism 12 and scanning device 14 are mounted in a rectangular box-shaped housing 16. Mounted at the top and enclosing housing 16 is a clear glass plate 18 on which personal identification cards 20 and 22 (FIG. 8) can be situated face down to be copied onto the back of check 24 (FIG. 7). If desired, outline marks of suitably sized identification cards may be made on glass plate 18 to facilitate the alignment of the cards with a check, or the glass plate may be located and made just big enough to accommodate the size and location of the cards so they will fit on the back of a check. Hinged at its right end to rear wall 26 of housing 16 is a top cover 28 which, when closed, covers glass plate 18 so that outside light cannot enter into check processing device 10 through the glass plate during check processing. Wiring 30 extends from the bottom of rear wall 26 of housing 16 and leads to a cash register (31 of FIG. 4).

Centered near the bottom and in front wall 34 of housing 16 is entrance slot 36 through which check 24 is inserted face down by the salesclerk. Entrance slot 36 narrows into check pathway 38 which runs horizontally the length of housing 16 until it reaches exit slot 40 near the bottom and in rear wall 26 of housing 16. A sensing trigger 42 is mounted just below check pathway 38 and just behind front wall 34.

The xerographic copy machine is located in the front portion of housing 16. Stamping mechanism 12 is mounted just behind the copy machine and just above check pathway 38. Scanning device 14 is mounted just behind stamping mechanism 12. It is situated so that part of it (lower scanner 14A) is just below check pathway 38 and part of it (upper scanner 14B) is just above the check pathway. Another sensing trigger 44 is mounted below check pathway 38 between stamping mechanism 12 and scanning device 14.

When a customer presents check 24 as payment for merchandise, the salesclerk lifts top cover 28, places the customer's identification 20 and 22 face down on glass plate 18 and closes the top cover. Check 24 is then inserted upside down into entrance slot 36 until it reaches sensing trigger 42. Sensing trigger 42 activates the copy machine. Thus, the customer's identification 20 and 22 is copied onto the back of check 24 and the check is advanced by the copy machine until it reaches sensing trigger 44 which deactivates the copy machine and activates stamping mechanism 12 and scanning device 14. Once stamping mechanism 12 stamps check 24 with the retailer's endorsement, transaction date, time and number (46 of FIG. 6), it activates the drive system of the copy machine again which propels the check through scanning device 14 and out through exit slot 40. Scanning device 14 reads account numbers 48 on the front of check 24, and sends them to the store computer 60 via wiring 30 and cash register 31 to be compared in a comparator 62 against "hot sheets" stored in the computer's memory 64. Also, scanning device 14 verifies the existence of a xerographic image of customer identification on the back of check 24. Thus, lower scanner 14A reads account numbers on the front of the check and upper scanner 14B verifies the existence of a xerographic image on the back of the check. Lower scanner 14A therefore senses magnetic characters whereas upper scanner 14B senses the intensity with which light is reflected from the back of the check and thereby determines whether a xerographic image has been formed on the back of the check. Once this comparison of checking account numbers with the "hot sheet" is made and verification of the existence of identification is complete, check tender button 50 of cash register 31 is enabled and the transaction may be completed.

Figure 1:
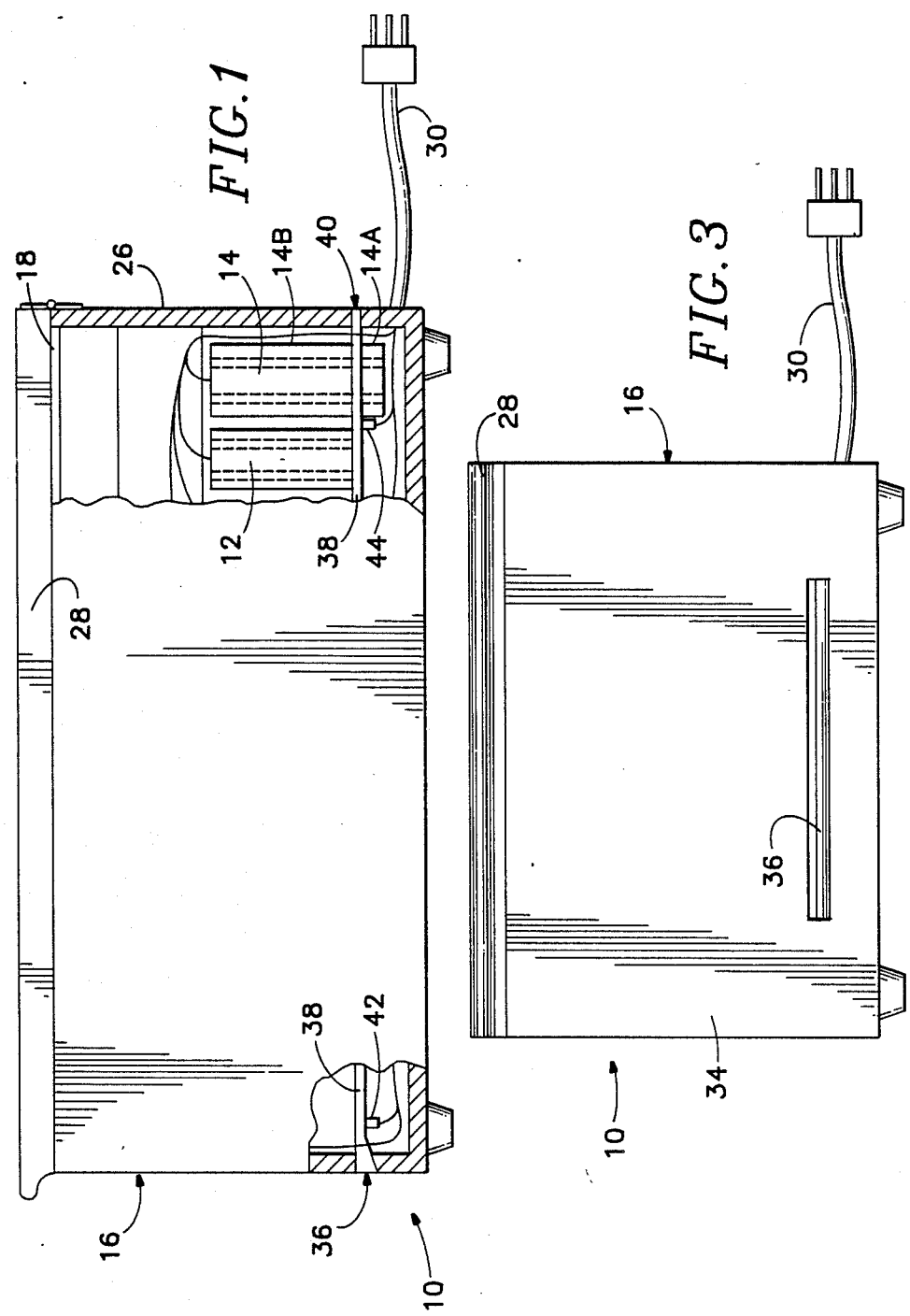
FIG. 1 is a side view schematic representation of a check processing device in accordance with the present invention with certain portions removed for clarity.
Figure 2:
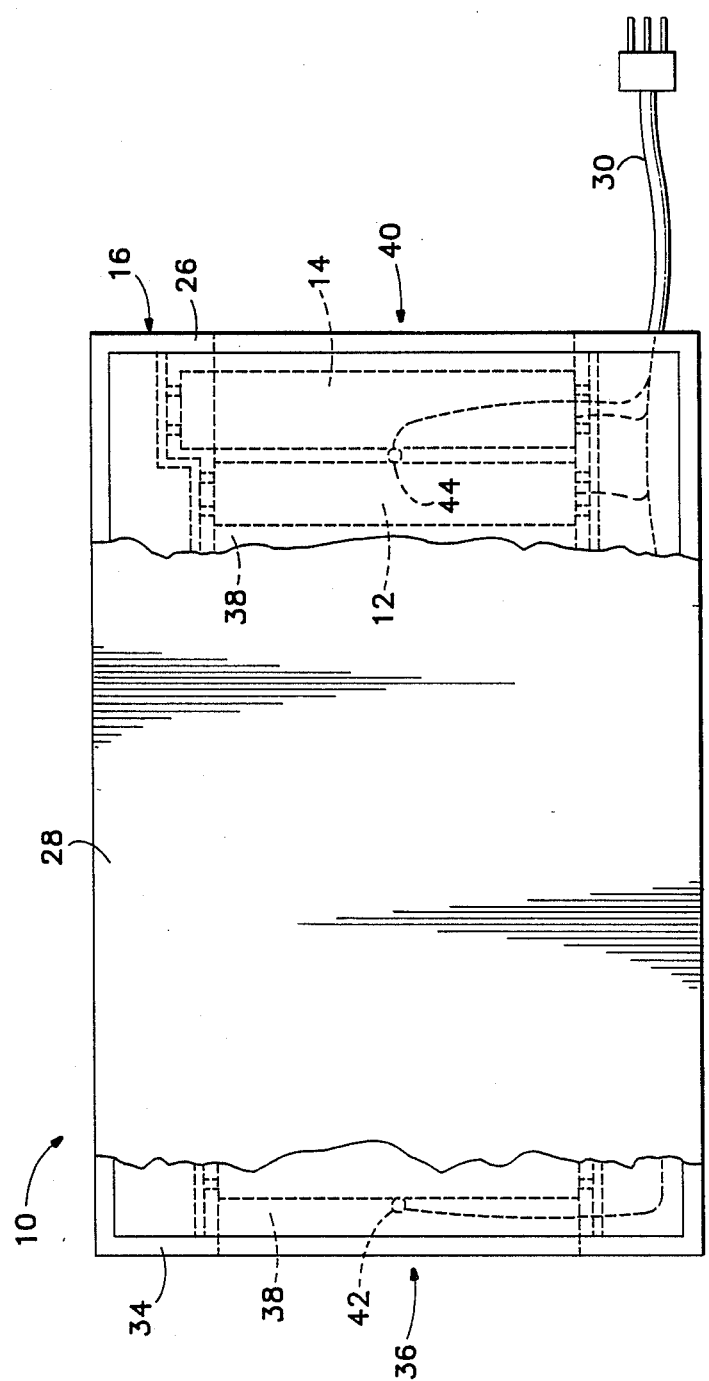
FIG. 2 is a top view schematic representation of the check processing device of FIG. 1 with certain portions removed for clarity.
Figure 4:
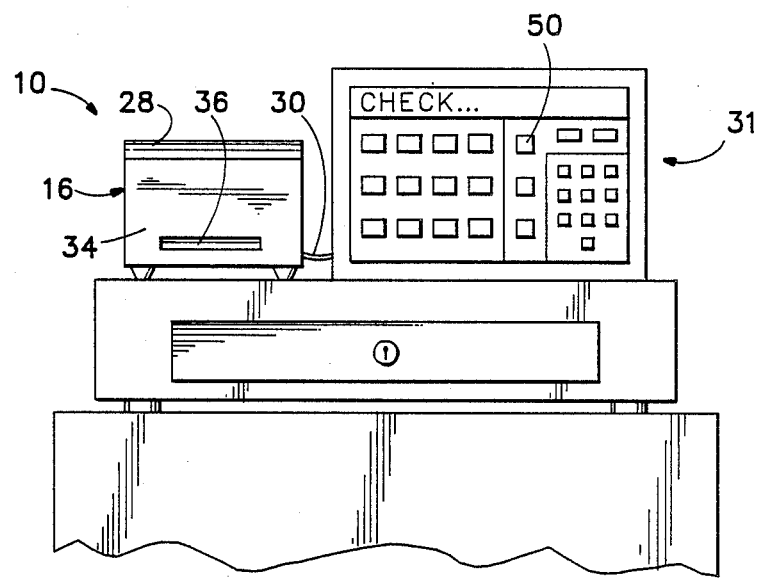
FIG. 4 is a pictorial representation of a point of sale terminal including a cash register hard wired to the check processing device of FIGS. 1-3.
Figure 6:
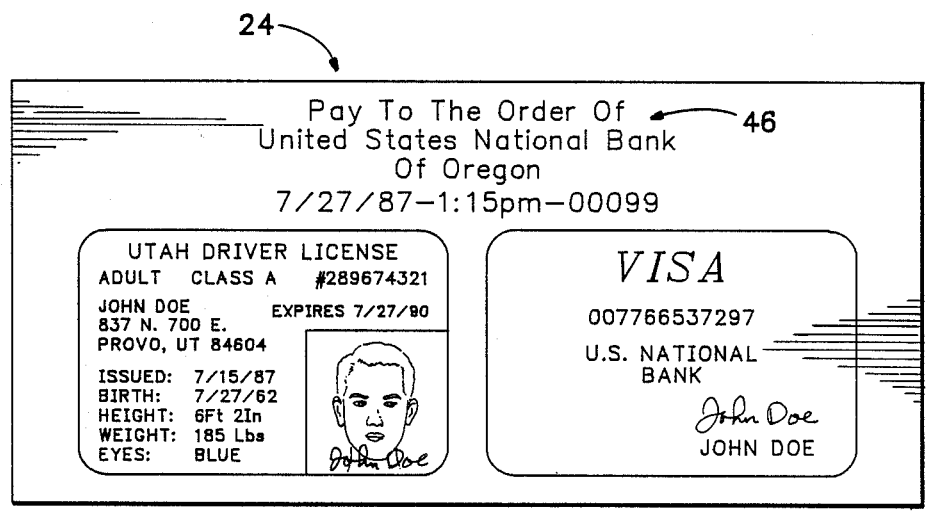
FIG. 6 is a pictorial representation of the back of a tendered check after it has been processed by the check processing device of FIGS. 1-3.
Figure 5:
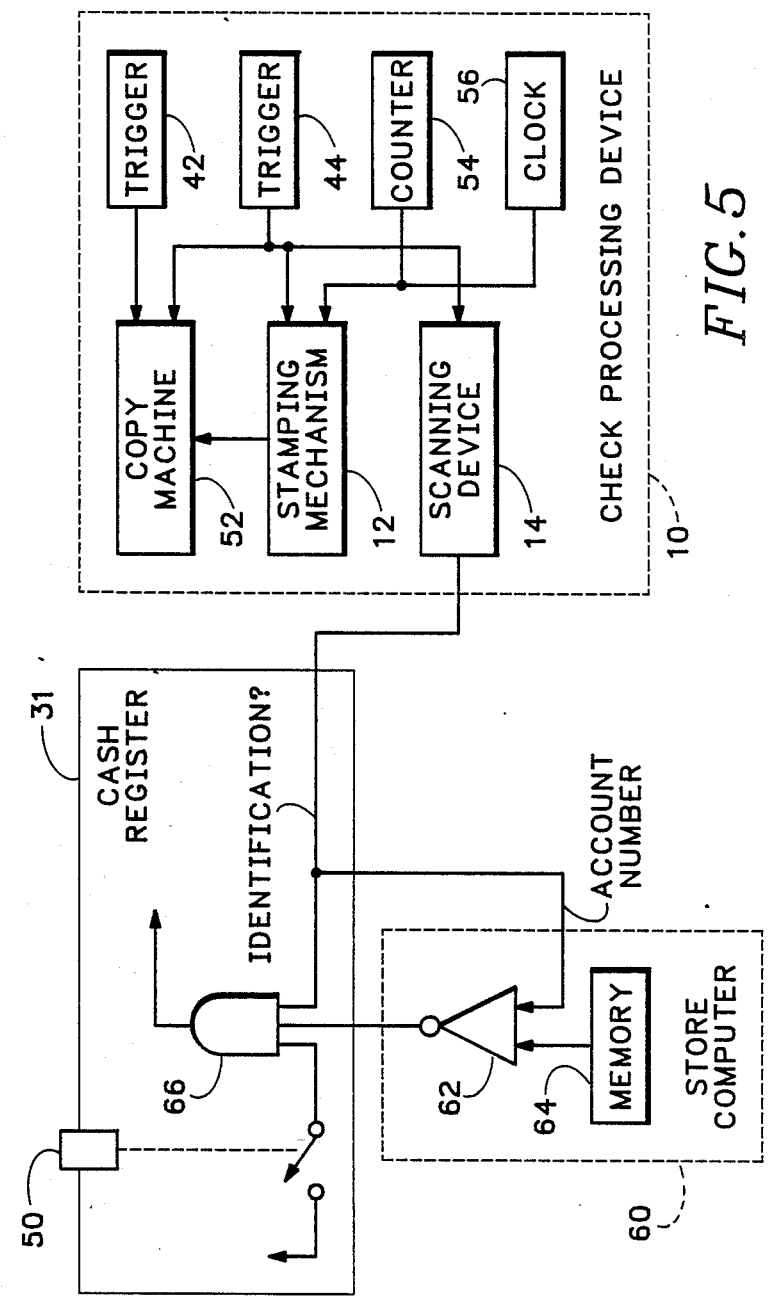
FIG. 5 is a block diagram of the point of sale terminal shown in FIG. 4.

Enabling of check tender button 50 is depicted schematically in FIG. 5 as being implemented by an AND gate 66 having three inputs. A first input represents the existence of an image of customer identification, a second the outcome of the comparison by comparator 62 (inverted so that the absence of a match appears as a logical 1 at the input to the AND gate) and the third the status of the check tender button. If the check tender button is pressed while the other two inputs to the AND gate are logical 1, the AND gate provides a logical 1 output and operation of the cash register is enabled.

It will be appreciated that the present invention is not restricted to the particular embodiment that has been described and illustrated, and that variations may be made therein without departing from the scope of the invention as defined in the appended claims and equivalents thereof. In particular, the invention is not restricted to use with checks since it may be desired to use the check processing device for transferring an image of personal identification onto another non-cash payment instrument, such as a credit card draft. Therefore, it is intended that the term "check processing device" as used herein be understood as covering not only a device designed for transferring an image of personal identification onto a check but also a device suitable for transferring an image of personal identification onto another form of payment instrument. Similarly, it is intended that the term "check tender button" as used herein be understood as covering not only a button designated as a check tender button but also a button for use in other non-cash transactions. Although a xerographic copy machine and an electronic stamping mechanism are used in the preferred embodiment of the present invention, it will be appreciated that any suitable processes of image reproduction and imprinting will do.

We claim:

1. A point of sale terminal comprising:
   a cash register having a check tender button,
   a check processing device for transferring an image of personal identification onto a payment instrument, and
   means for enabling the check tender button after said check processing device has been operated.

2. A check processing device comprising:
   means for reading an account number from a check,
   means for transferring an image of personal identification onto said check,
   means for warning a salesclerk of a stolen or invalid check and controlling a cash register in accordance with the presence and validity of said check and the presence of said personal identification, and means for updating transaction information and imprinting said transaction information on said check.

3. A device according to claim 2, wherein said means for reading said account number from said check comprises scanning device which reads and sends said account numbers to a computer.

4. A device according to claim 2, wherein said means for transferring an image of personal identification onto a check comprises a photocopier which utilizes a xerographic copying process.

5. A device according to claim 2, wherein said means for updating transaction information and imprinting said transaction information on said check comprises an electronically updated and controlled stamping device.

6. In combination, a cash register having a check tender button, a computer having numbers stored therein, and a device in accordance with claim 2, wherein said warning means comprises a means for comparing said account number with the numbers stored in the computer and disallowing use of the cash register's check tender button when said account number is found among the numbers stored in the computer.

7. A combination according to claim 6, wherein the warning means further comprises means for disallowing use of the check tender button when personal identification does not accompany a check.

* * * * *

UNITED STATES PATENT AND TRADEMARK OFFICE
CERTIFICATE OF CORRECTION

PATENT NO. : 4,933,536
DATED : June 12, 1990
INVENTOR(S) : DENNIS LINDEMANN et al It is certified that error appears in the above-identified patent and that said Letters Patent is hereby corrected as shown below:

Cover sheet, left column, ICIREPAT [75], after "Oreg." insert
--Howard P. Russell, Houston, Tex.--.

Column 4, line 27, "deferring" should be --deterring--.

Column 8, line 6, delete "a".

Signed and Sealed this

Eighteenth Day of June, 1991

*Attest:*

HARRY F. MANBECK, JR.

*Attesting Officer*  *Commissioner of Patents and Trademarks*